Feb. 19, 1935.  C. J. RIXEN  1,991,578
PHOTOGRAPHIC CAMERA
Filed Aug. 3, 1933  2 Sheets-Sheet 1
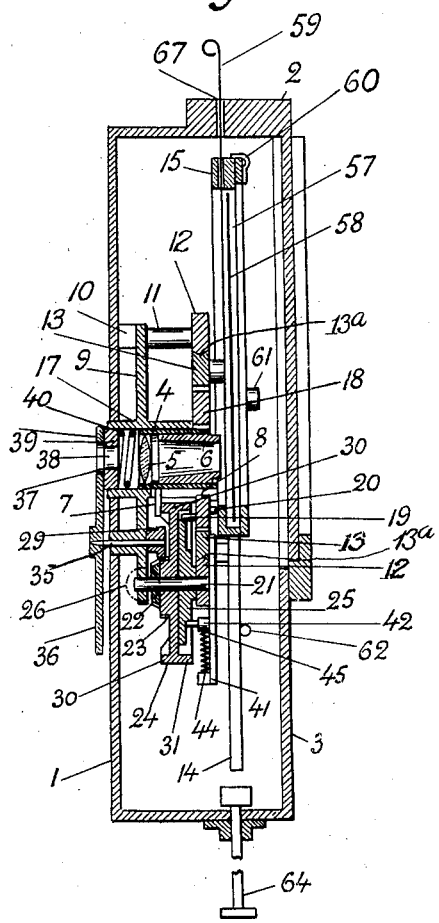
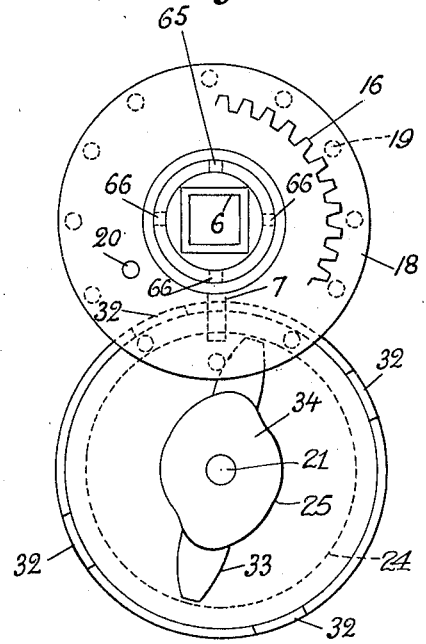
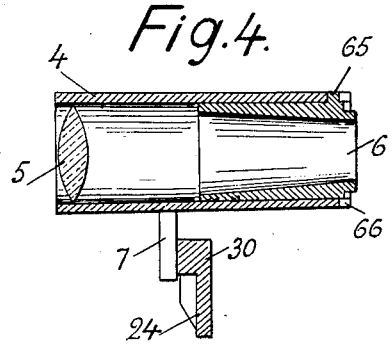
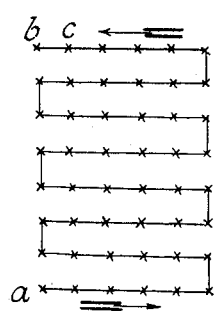
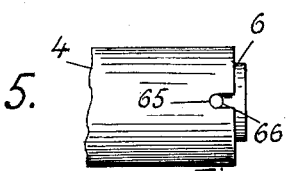
Carl Johan Rixen
INVENTOR Feb. 19, 1935.  C. J. RIXEN  1,991,578
PHOTOGRAPHIC CAMERA
Filed Aug. 3, 1933   2 Sheets-Sheet 2

Carl Johan Rixen
INVENTOR
By Otto Munk
his ATTORNEY.

Patented Feb. 19, 1935

1,991,578

UNITED STATES PATENT OFFICE 1,991,578

PHOTOGRAPHIC CAMERA

Carl Johan Rixen, Copenhagen, Denmark, assignor to Hugh Tevis, London, England

Application August 3, 1933, Serial No. 683,452
In Denmark August 9, 1932

14 Claims. (Cl. 88—16)

My invention relates to photographic cameras and particularly to cameras by which a plurality of successive small sized exposures are made on a single piece of sensitized material, either plate or film, and has for its primary object the provision of means for effecting such exposures repeatedly, if desired, and with a sharpness of focus that will permit substantial enlargement of the original negative images without loss of photographic clarity.

An important object of my invention lies in the provision of a lens mount slidably mounted in the camera, which carries a lens, the focal plane of which coincides with the light exit end of the mount, said end comprising an image size determining frame, adapted for contact engagement with the sensitized material during exposure.

Another object and feature lies in the provision of means for adjusting the focal plane relationship between the above named frame end of the lens mount and the lens to adapt the camera for taking objects at different distances.

A further object is to provide a negative support or holder and means for adjusting the same to successively bring new, unexposed areas into alignment with the lens mount for exposure.

Still another object is to provide means whereby during the shifting of the negative holder the lens tube will be out of engagement with the negative and when the holder has reached its position of adjustment the lens mount will engage said negative, thus ensuring accuracy of focus during exposure.

Another object is to provide an actuating means whereby the rotation of a single shaft by the operator will cause the various movements above referred to in sequence.

Still a further object is to provide means whereby when the last exposure on the negative has been made the operating shaft is prevented from further rotation.

Other objects and advantages will be apparent as the description proceeds, reference now being had to the figures of the accompanying drawings wherein like reference numerals indicate like parts.

In the drawings:

Fig. 1 is a transverse sectional view of the apparatus,

Fig. 3 is a view of the moving mechanism, on an enlarged scale, Fig. 4 is a sectional view of the lens tube, Fig. 5 is a detail side view of one end of the lens tube, Fig. 6 is a diagrammatic representation of the path of movement of the plate.

Figure 2:
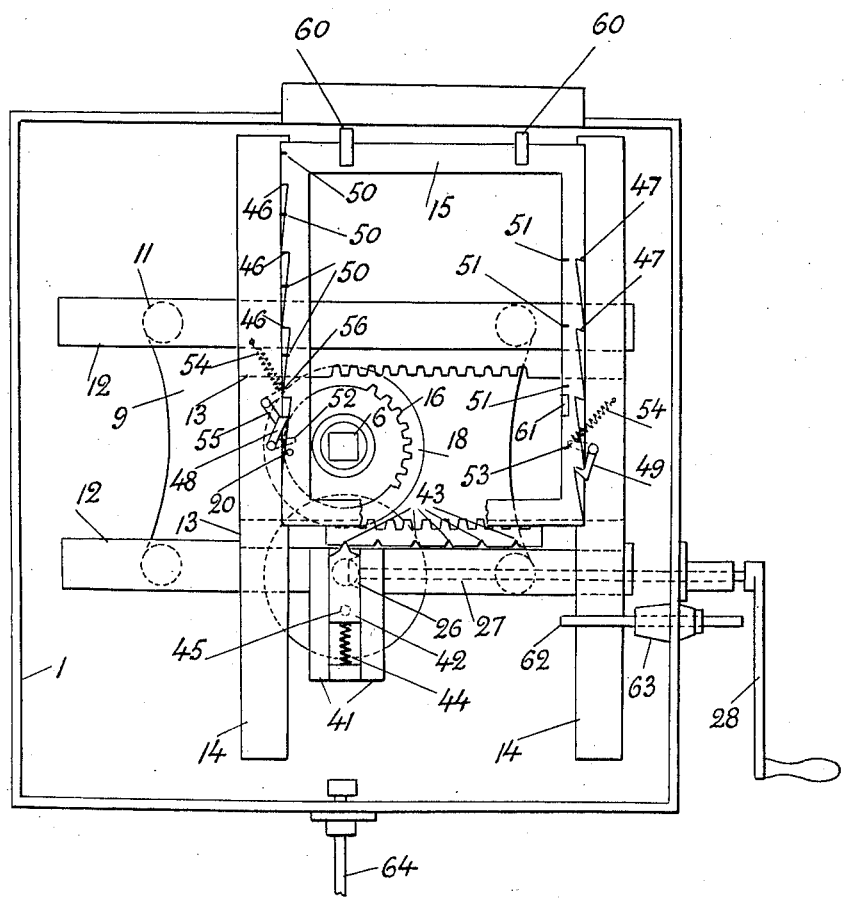
Fig. 2 is a view of the apparatus in rear elevation with the camera cover removed.

In Figs. 1 and 2, 1 indicates a camera box of wood or other suitable material, which is fitted with a conventional sliding door 2 provided in the cover 3. To the front wall of the camera box a metal body 9 with a circular bore is attached, in in which bore a lens tube 4 can move back and forth in light-tight manner. The tube 4 supports at one end the lens 5, and the other end of the tube encircles another tube 6 fitting light-tightly and being adapted to be turned by hand and moved back and forth in the tube 4. The latter is fitted with a fixed pin 7 adapted to move freely back and forth in a slot 8 cut into the hub 17 of the metal body 9. This body is fitted with one or more lugs 10 serving to attach the said body to the box 1 and one or more lugs 11 to which two fixed, horizontal parallel rails 12 are attached, forming guides for two other slidable rails 13, which are fitted with milled V-grooves as at 13a (Figure 1). The rails 13 are firmly interconnected by means of two vertically disposed parallel rails 14 forming guides for the frame 15. By a suitable movement of the rails 13 and 14, and the frame 15 thereon the frame 15 can be so disposed as to bring any point of the opening of the frame into line with the longitudinal axis of the lens.

Both rails 13 are constructed as toothed racks with the teeth facing each other (Figure 2). The distance between the racks is determined by the toothed segment 16, which is attached to a wheel 18 rotatably mounted upon the fixed hub 17 of the body 9, and adapted upon rotation of the wheel to alternately engage and move said rails 13. The number of teeth on the toothed segment is such that the segment can not come into engagement with both racks at the same time. The wheel 18 is fitted with twelve pins 19, which are disposed at points equi-distant from the center and equally spaced apart, and extend forwardly toward the lens 5. (See also Fig. 3.) The wheel 18 is further fitted on its opposite side with another pin 20, situated nearer to the center and extending in the opposite direction from the pins 19. On the shaft 21, one end of which is journaled in the metal body 9 and the other end in the lower fixed rail 12, four rigidly interconnected members 22—23—24 and 25 are disposed. The member 22 is a bevel gear-wheel engaging another bevel gear-wheel 26, (dotted lines, Figures 1 and 2) which is fixed on a shaft 27, and can be moved by means of the crank handle 28. The member 23 is a cylindrical gear-wheel, which is in engagement with another gear-wheel 29 on a shaft 35 journaled in a boss on the body 9, and extending outwardly through the casing 1. The member 24 is a circular disk provided on its forward side and adjacent its periphery, with two spaced cams 30 by means of which the lens tube 4 can be moved back and forth by engagement of the cams with the pin 7, upon rotation of the disk 24. On its other side the disk 24 is fitted with a circular flange 31, which has such an inside diameter and such a width that it is just able to encompass three of the pins 19 on the wheel 18 at a time. In order to enable the pins 19 to be released during the rotation, the flange 31 is fitted with four recesses 32. The member 25 is partly shaped as a gear-wheel with two teeth 33 and partly as a cam disk 34. The position of the members 24 and 25 relatively to one another is of such a nature that the cams 30 and the teeth 33 will be co-incident. The length of the teeth 33 on the gear wheel 25 is such that they are adapted upon rotation, to alternately come into engagement with one of the pins 19 on the wheel 18, when the said pin is nearest to the shaft 21, and just can move past the other two adjacent pins, so that whenever a tooth 33 passes the wheel 18, the same will rotate one-twelfth of a revolution, and will then remain stationary until the next tooth comes into engagement.

The gear-wheel 29, which has half as many teeth as the gear 23, is fixed on the shaft 35 supporting, at its outer end, a shutter disk 36. The latter is provided with an aperture 37, which is adjustable in any known manner, and when the disk is rotating, moves past the lens aperture 38, which is formed as a bore in the disk 39. Between this disk and the lens tube 4 a spring 40 is provided, which partly presses the disk 39 against the shutter disk 36, and partly presses the lens tube 4 in the opposite direction, in such a manner that the pin 7 will be pressed against the wheel 24 in the path of the cams 30 thereon. The position of the disk 36, relatively to the other members, is such that the aperture 37 will pass the lens aperture, when the cams 30 are horizontally disposed and out of engagement with the pin 7.

On the lower rail 12 two guides 41 are provided (Figure 2), between which is slidably mounted a pawl 42, adapted to engage one of several notches 43 on the underside of the rail 13 and, thereby hold the latter in its various positions of adjustment relatively to the rail 12. The pawl 42 is normally urged into engagement with the rail 13 by means of the spring 44 and is guided by the pin 45, which rests on the periphery of the cam disk 34 and is moved by the rotation of the latter.

On the side facing the cover 2 the frame 15 is fitted with a series of notches 46 and 47, by means of which the pawls 48 and 49 which are pivoted to the rails 14, can hold the frame 15 in various positions of vertical adjustment. The distances between the notches 46 and between the notches 47 are each equal to twice the distance between the recorded images in vertical direction, and by offsetting the notches properly to one another, all as shown in Figure 2 the result can be attained that the frame 15 will be permitted to move downwardly one image space by the pawls 48 and 49 coming alternately into engagement with the corresponding notches. The frame 15 is further fitted with two rows of cams 50 and 51, which are disposed similarly to the notches 46 and 47. The pawls 48 and 49 are rigidly connected to the arms 52 and 53, respectively, which are situated on the other side of the rails 14 and at such a distance from the latter that they can come into contact with the pin 20 disposed on the wheel 18, when the frame 15 is in one of the extreme lateral positions. Both pawls are pressed inward by the springs 54. On the left rail 14 a bell-crank lever with arms 55 and 56 is further provided, the arm 55 engaging the pawl 48, while 56 is shaped in such a manner that it can come into contact with the cams 50, successively as the frame 15 moves downward. The frame 15 serves to hold the plate-holder 57, which contains the photographic plate 58, and is closed by the cover 59 before and after the exposure. The cover 59 is long enough that when the plate-holder is closed it will project outside of the camera box 1 through a light-tight slit 67 formed between the latter and the sliding door 2. The plate-holder is attached to the frame 15 by means of the springs 60. The frame 15 is further fitted with a lug 61 coming, in the bottommost position of the frame, in line with the pin 62, which by way of a light-tight bushing 63 passes out through the side wall of the camera box 1. At the bottom of the camera box and in line with the frame 15 a sliding rod 64 is provided, which similarly in light-tight manner passes out through the bottom of the camera box. The purpose of these devices will appear as the description proceeds.

Figs. 3 and 4 show the construction of the lens tube 4 on a larger scale. The lens 5 is rigidly fixed in one end of the tube. At the other end the tube 6 is slidably and rotatably attached, the opening of which, towards the photographic plate, is shaped according to the desired size and shape of the images. In the construction shown the shape is quadratic. The tube is fitted with a pin 65 which fits into recesses 66 of various depths in the end of the tube 4. By a rotation of the tube 6 and the insertion of the pin 65 in the various recesses 66 the distance of the lens from the photographic plate can be altered, as, during the exposures the tube 6 rests against the plate. When these recesses have been made for the various focal distances to the subject desired to be used, it will merely be necessary to turn the tube 6 to the corresponding recess, without the necessity of further adjustments of the apparatus every time.

When an exposure is to be made with the apparatus, the plate-holder 57 with the photographic plate 58 is inserted into the frame 15, where the said plate-holder will be held in position by the springs 60, after which the sliding door 2 is placed into position. Then the plate-holder slide 59 is pulled so far upward that it leaves the plate-holder entirely, but remains inserted in the light-tight slit 67 in the camera box, where it is held in position by suitable means during the exposure.

If now the crank 28 is turned after having been released, the mechanism will be set into operation. The tooth 33 that rests on one of the pins 19 of the wheel 18 will turn the wheel 18 and, thereby, the toothed sector 16. The pin 20 will thereby lift the pawl 48 and the bell-crank lever 55—56 away from the frame 15, but as the latter, at the given moment, is held in position by the pawl 49 on the other side, and the toothed segment 16 is not yet in engagement with either of the racks 13, the frame and thereby the photographic plate will remain in the same position. When the tooth 33 has moved so far that it releases the pin 19, the wheel 18 will cease to move, and will be held in position, because the flange 31 encircles the pins 19. Besides, the frame 15 is held in position by the pawl 42, which by the spring 44 is held in position in the first notch 43. At this moment the cam 30 on the wheel 24 disengages the pin 7, after which the spring 40 presses the lens tube 4 against the photographic plate 58. A moment later the exposure of the plate is effected, by the aperture in the disk 36 passing the lens aperture 38. By the continued rotation of the crank the lens tube is again pushed away from the plate 58 by the next cam 30, so that the tube will be entirely withdrawn, when the next tooth 33 comes into engagement with the pins 19. A moment before this happens, the cam disk 34 has lifted the pawl 42 out of engagement with the first notch 43, after which the toothed sector, which has now come into engagement with the lower rack 13, can freely displace the latter and, thereby, the frame 15 and the photographic plate 58 to the left. The tooth 33 will rotate the segment 16 one-twelfth of a revolution, before it releases the pin 19, but before this entire rotation has taken place the cam disk 34 will have released the pawl 42, which now will be pressed up against the rack 13 by means of the spring 44. The distance between the notches 43 corresponds exactly to the motion imparted by the segment 16 to the rack 13 during one twelfth of a revolution, and even if there might be some smaller inaccuracy, due for instance to wear of the teeth 33, the pawl 42 will easily, on account of the spring pressure, be able to finish the motion and secure the accurate new position of the plate. The exposure of the next image will now be effected in the same manner as before, as the disk 36 will make two revolutions for each revolution of the shaft 21, and so on, until the frame 15 has been moved into the extreme lefthand position, in which the toothed segment has come out of engagement with the lower rack 13. In this position the wheel 18 has rotated so far that the pin 20 has come into contact with the arm 53, which by the continued rotation will be moved downward, whereby the pawl 49 will come out of engagement with the bottommost notch 47, in which it has until now maintained the frame 15 in position. A moment afterwards the pin 20 comes into contact with the bottommost cam 51, by which the frame 15 will be pressed downward, until it is stopped by the pawl 48 on the other side, which by means of the spring 54 is pressed into the bottommost notch 46, after which the frame will be in the position fitting the next row of images. At the same time the segment 16 is rotated so far that it has just come into engagement with the upper rack 13, after which it stops, while the first image in the new row is being exposed. The motion in this row is exactly as before, only in the opposite direction, until the same position of the frame and the toothed segment has been attained as shown in Fig. 2, in which position the pin 20 has come into contact with the arm 52 with an upward motion. By this motion the arm 52 will throw the pawl 48 out of engagement with the notch 46, and will thereby release the frame 15. At the same time it will press on the arm 55, whereby the arm 56 will come into contact with the bottommost cam 50, which has been moved downward at the first drop of the frame 15. The arm will now press the frame downward, until it is stopped by the pawl 49, which engages the next notch 47 and so forth. The exposures will be effected at the places marked with an $x$ in Fig. 6, which shows diagrammatically the path of the photographic plate during the entire operation, starting at $a$ and ending at $b$ and following the directions of the arrows.

When the frame and the photographic plate have reached a position opposite the point $c$ in Fig. 6, and assuming an image in this position to have just been exposed, the tappet 61, when the plate is moving towards $b$, will be at the same level as the pin 62, which by its motion will push outward, until it comes so far out that the crank handle 28 cannot pass it any longer. The position of the crank on the shaft 27 is now adjusted in such a manner that the crank can make about a quarter of a revolution after the exposure of the last image has taken place, until the crank handle is stopped by the pin 62, after which all the members with the exception of the frame with the plate will be situated in the initial position as shown in Fig. 2. The lens has been withdrawn, the light is shut out, the pawl 42 maintains the frame 15 in the first notch 43, and the frame can then by means of the rod 64 be pushed up into the initial position, the pawls 48 and 49 being shaped in such a manner that they will yield to motions in the upward direction. The plate-holder 57 is now situated exactly opposite the slit 67, for which reason the cover 59 can easily be caused to close the plate-holder. After this the sliding door 2 is removed, and the plate-holder is withdrawn. At the next exposure the pin 62 is pushed back, whereby the crank handle is again set free.

If during the exposures the apparatus can be maintained entirely or approximately vertical, the same may be simplified somewhat, as the frame 15 can then drop by action of gravity and, thereby, automatically perform the vertical motions. The cams 50—51 and the double arm 55—56 may then be dispensed with altogether, but the arrangement remains otherwise the same.

I claim.

1. A photographic camera comprising a movable lens mount having a lens fixed therein, the focal plane of said lens coinciding with the light exit end of said mount, means for supporting sensitized material in position for exposure through said lens and adapted for adjustment to bring new exposure areas into alignment with said lens, and means for moving said lens mount into actual contact with the sensitized material for each exposure.

2. A photographic camera comprising a lens mount having a lens fixed therein, the focal plane of said lens coinciding with the light exit end of said mount, means for supporting a sensitized material for exposure through said lens and adapted for adjustment to bring new exposure areas into alignment with said lens, said lens and the sensitized material being out of focus with each other between exposures, and means for causing the light exit end of the lens mount and the sensitized material to come into actual contact engagement for each exposure.

3. A photographic camera comprising a lens mount having a lens fixed therein, the focal plane of said lens coinciding with the light exit end of said mount, means for supporting a sensitized material for exposure through said lens and adapted for adjustment to bring new exposure areas into alignment with said lens, said lens and the sensitized material being out of focus with each other between exposures, means for causing the light exit end of the lens mount and the sensitized material to come into actual contact engagement for each exposure, and means for separating the lens mount and the sensitized material between exposures and during the adjustment of the latter.

4. A photographic camera comprising a lens mount having a lens fixed therein, the focal plane of said lens coinciding with the light exit end of said mount, said end comprising a smooth surfaced image size determining frame and adapted for contact engagement with a sensitized material, means for supporting the sensitized material in alignment with said lens, and means for causing actual contact engagement between said frame end of the lens mount and the sensitized material for exposure.

5. A photographic camera comprising a lens mount having a lens fixed therein, the focal plane of said lens coinciding with the light exit end of said mount, said end comprising a smooth surfaced image size determining frame and adapted for contact engagement with a sensitized material, means for supporting and adjusting a sensitized material to bring the different areas thereof into alignment with said lens, and means for causing contact engagement between said frame end of the lens mount and the sensitized material for exposure.

6. A photographic camera comprising a lens mount having a lens fixed therein, the focal plane of said lens coinciding with the light exit end of said mount, said end comprising a smooth surfaced image size determining frame and adapted for contact engagement with a sensitized material means for supporting and adjusting a sensitized material to bring the different areas thereof into alignment with said lens, means for causing contact engagement between said frame end of the lens mount and the sensitized material for exposure, and means for adjusting the fixed focal relationship between said lens and said frame end of the lens mount.

7. A photographic camera comprising a lens tube having a lens fixed therein, the focal plane of said lens coinciding with the light exit end of said tube, means for supporting sensitized material and for bringing different areas thereof into alignment with said lens tube for exposure, said tube being slidably mounted, means for moving said tube into intimate contact engagement with the sensitized material, and means to hold said tube out of engagement with said material except during exposure.

8. A photographic camera comprising a lens tube slidably mounted, a holder carrying a sensitized material and adjustable with respect to said lens tube whereby a plurality of exposures may be made on said material, a lens in said tube, the focal plane of said lens coinciding with the light exit end of said tube, and means for sliding said tube to bring said end into and out of contact engagement with the sensitized material in said holder.

9. A photographic camera comprising a lens tube slidably mounted, a holder carrying a sensitized material and adjustable with respect to said lens tube whereby a plurality of exposures may be made on said material, a lens in said tube, the focal plane of said lens coinciding with the light exit end of said tube, means for sliding said tube to bring said end into and out of contact engagement with the sensitized material in said holder, and means for adjusting said holder between exposures and when said tube is out of engagement with said material.

10. A photographic camera comprising a lens tube slidably mounted, a holder carrying a sensitized material, means for periodically adjusting the position of said holder in a definite path to successively bring different areas of said material into alignment with said lens tube for exposure, a lens in said tube, the focal plane of said lens coinciding with the light exit end of said tube, said end constituting an image frame end, a shutter, a rotatable shaft, and means operated by the rotation of said shaft for adjusting said holder, moving said lens tube into contact engagement with said sensitized material after adjustment thereof, and operating said shutter to expose said material during said contact engagement.

11. A photographic camera comprising a lens tube slidably mounted, a holder carrying a sensitized material, means for periodically adjusting the position of said holder in a definite path to successively bring different areas of said material into alignment with said lens tube for exposure, a lens in said tube, the focal plane of said lens coinciding with the light exit end of said tube, said end constituting an image frame end, a shutter, a rotatable shaft and means operated by the rotation of said shaft for adjusting said holder, moving said lens tube into contact engagement with said sensitized material after adjustment thereof, and operating said shutter to expose said material during said contact engagement, and means operable when the last exposure on said material has been made to stop further rotation of said shaft.

12. A photographic camera comprising a lens tube slidably mounted, a holder carrying a sensitized material and adjustable with respect to said lens tube whereby a plurality of exposures may be made on said material, a lens in said tube, the focal plane of said lens coinciding with the light exit end of said tube, means for sliding said tube to bring said end into and out of contact engagement with the sensitized material in said holder, means for adjusting said holder between exposures and when said tube is out of engagement with said material, and means cooperating with said holder for resiliently centering and locking the same in each position of adjustment whereby to prevent overlapping of exposures on the sensitized material in said holder.

13. A photographic camera comprising a lens tube slidably mounted, a holder carrying a sensitized material, means for periodically adjusting the position of said holder in a definite path to successively bring different areas of said material into alignment with said lens tube for exposure, a lens in said tube, the focal plane of said lens coinciding with the light exit end of said tube, said end constituting an image frame end, a shutter, a rotatable shaft, means operated by the rotation of said shaft for adjusting said holder, moving said lens tube into contact engagement with said sensitized material after adjustment thereof, and operating said shutter to expose said material during said contact engagement, and means for manually shifting said holder back to its original starting position upon completion of its periodic adjustments for exposure comprising a slidable rod engageable with said holder.

14. A photographic camera comprising a lens tube slidably mounted, a holder carrying a sensitized material and adjustable with respect to said lens tube whereby a plurality of exposures may be made on said material, a lens in said tube, the focal plane of said lens coinciding with the light exit end of said tube, means for sliding said tube to bring said end into and out of contact engagement with the sensitized material in said holder, means for adjusting said holder between exposures and when said tube is out of engagement with said material, and means on said holder for limiting the movement thereof upon each adjustment to new exposure position.

CARL JOHAN RIXEN.